United States Patent
Pando

(12) 
(10) Patent No.: US 6,382,574 B1
(45) Date of Patent: *May 7, 2002

(54) SELF-MOUNTING DEVICE TO SUPPORT ARTICLES

(76) Inventor: Richard Pando, 12836 Nutwood St., Garden Grove, CA (US) 92840

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,510

(22) Filed: Apr. 28, 1999

(51) Int. Cl.⁷ ............................................. F16M 11/00
(52) U.S. Cl. ................ 248/205.8; 248/309.1; 248/363; 248/683; 294/64.1
(58) Field of Search .................. 248/205.8, 550, 248/205.5, 363, 205.7, 206.2, 682, 690, 692, 683, 304, 309.4, 205.2, 309.1; 294/64.1

(56) References Cited

U.S. PATENT DOCUMENTS

| | | | | |
|---|---|---|---|---|
| 3,568,959 A | * | 3/1971 | Blatt ......................... | 294/64.1 |
| 4,043,531 A | * | 8/1977 | Green ........................ | 248/537 |
| 4,225,106 A | * | 9/1980 | Eplan ...................... | 248/309.1 |
| 4,455,006 A | * | 6/1984 | Aaserude ................. | 248/205.5 |
| 4,957,318 A | * | 9/1990 | Blatt ......................... | 294/64.1 |
| 4,979,710 A | * | 12/1990 | Baldwin .................... | 248/210 |
| 5,184,858 A | * | 2/1993 | Arai ........................... | 294/64.1 |
| 5,188,411 A | * | 2/1993 | Golden ...................... | 294/64.1 |
| 5,630,517 A | * | 5/1997 | Maznik ..................... | 211/70.6 |
| 5,795,001 A | * | 8/1998 | Burke ....................... | 294/64.1 |
| 5,956,861 A | * | 9/1999 | Barnes .......................... | 34/90 |

\* cited by examiner

*Primary Examiner*—Anita King
(74) *Attorney, Agent, or Firm*—Rutan & Tucker, LLP; Robert D. Fish

(57) ABSTRACT

Device and methods are provided in which a motorized suction device is suctionally mounted to a static surface, and an article supporting portion other than a handle is employed to support one or more articles above the ground. The vacuum is preferably provided by a battery operated electric vacuum pump, and the article supporting portion preferably comprises a shelf, a channel, a magnet, a ring, a hook and loop fastener, or a hook.

13 Claims, 1 Drawing Sheet

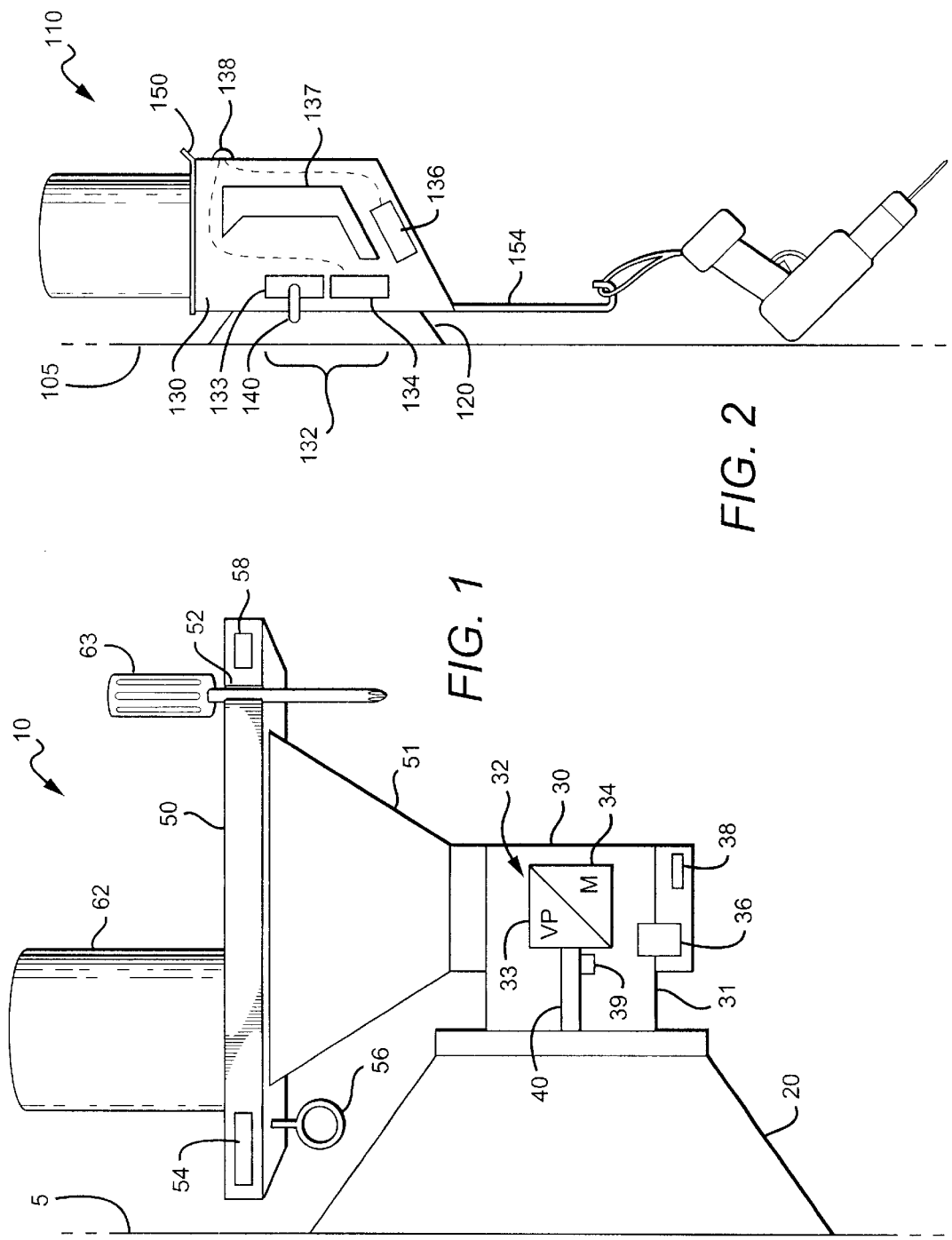

SELF-MOUNTING DEVICE TO SUPPORT ARTICLES

FIELD OF THE INVENTION

The field of the invention is tools.

BACKGROUND OF THE INVENTION

It is known in the art that vacuum can be used to at least temporarily couple two articles. One of the articles typically comprises a vacuum suction device in which a partial vacuum can be produced when applied to a surface. The other article usually provides a suction surface, which is contacted by the vacuum suction device.

Many different applications known in the art make use of employing vacuum to couple articles, and such applications may be broadly sorted into two categories. In the first category, vacuum is applied to a suction surface of an article to move that article. In one example, a simple manually operated vacuum suction device (C. R. Lawrence, Los Angeles, Calif.; Cat No. 505) with a housing is placed onto a suction surface of an article, and vacuum is applied by operating a lever. The article can then be transported by manually holding onto the housing, and releasing the vacuum after the article is transported to a desired location. Although the operation of a simple, manually operated vacuum suction device is relatively easy, there are several disadvantages. The strength of the applied vacuum can not usually be altered during the moving operation in the presence of a leak. Furthermore, the suction surface must generally be sufficiently smooth to ensure a vacuum build-up. Moreover, the transport must often be interrupted if a leakage of the vacuum occurs.

To avoid at least some of the problems associated with a simple, manually operated vacuum suction device, multiple suction cups can be installed on one device. Multiple suction cups typically reduce the risk of a surprising loss of function, however, the weight of an article to be transported, and the smoothness of the suction surface still often determine how long a sufficient vacuum can be maintained.

To counteract the loss of vacuum in suction devices used to move articles, vacuum sources have been coupled to a vacuum suction device. In some cases, the vacuum source is a vacuum generator directly coupled to the vacuum suction device. For example, in U.S. Pat. No. 5,95,001 to Burke, an electrical motor and a vacuum pump are incorporated into a housing of a manually operated vacuum suction device that is used to move articles, and a vacuum is applied by removing air from the suction cup. In another example, in U.S. Pat. No. 4,155,583 to Mikos, et al., a vacuum suction device to transport large plates of concrete is shown, wherein a plurality of vacuum pumps are directly coupled to a vacuum suction device. In other cases, the vacuum source is indirectly coupled to the vacuum suction device. In U.S. Pat. No. 4,787,662 to Dewez, for example, a plurality of vacuum conduction tubes connects to a vacuum source that is physically separated from the vacuum suction device.

Although vacuum sources coupled to a vacuum suction device help prevent loss of vacuum during moving of an article, many of those vacuum suction devices tend to be large and relatively expensive.

In the second category, a vacuum suction device is applied to a stationary suction surface to affix the vacuum suction device to the stationary suction surface. Generally, such vacuum suction devices are less elaborate and usually carry relatively light loads. For example, in U.S. Pat. No. 5,028, 026 to Phillips, a vacuum suction device is described, in which a simple suction cup is connected to a rod bracket that serves as a plant holder. In U.S. Pat. No. 4,984,693 to Belokin, a plurality of suction cups in used to affix a product display shelf to a smooth surface. In a further example, U.S. Pat. No. 4,893,363 to Huff, a plurality of submerged suction cups is shown to affix a wall table for swimming pools.

Despite the relatively simple construction of most vacuum suction devices used to be affixed to a stationary suction surface, leakage of air into the evacuated suction cup will eventually occur due to unevenness of the suction surface, or due to weight or torsion strains onto the devices. Surprisingly, however, there is no vacuum suction device that is used to be affixed to a stationary suction surface, in which an undesired influx of air can be automatically removed. Therefore, there is a need to provide a vacuum suction device that is affixed to a stationary suction surface, and in which an undesired influx of air can be automatically removed.

SUMMARY OF THE INVENTION

The present invention provides device and methods in which a motorized suction device is suctionally mounted to a static surface, and an article supporting portion other than a handle is employed to support one or more articles above the ground.

In preferred embodiments the vacuum is provided by a battery operated electric vacuum pump, and the article supporting portion comprises a shelf, a channel, a magnet, a ring, a hook and loop fastener, or a hook.

Various objects, features, aspects and advantages of the present invention will become more apparent from the following detailed description of preferred embodiments of the invention.

BRIEF DESCRIPTION OF THE DRAWING

FIG. 1 is a schematic side view of one embodiment of the inventive subject matter.

FIG. 2 is a schematic side view of another embodiment of the inventive subject matter.

DETAILED DESCRIPTION

In FIG. 1, a self-mounting device 10 generally has a housing 30, to which is coupled a suction cup 20 and a shelf 50. Housing 30 generally comprises a vacuum generator 32, having vacuum pump 33, and motor 34. A power source 36 is electronically connected to motor 34 via switch 38.

In practice, the device 10 is juxtaposed to a wall 5 or other static surface, the motor is engaged, and the vacuum generator 32 creates a sufficient vacuum at the suction cup 30 to hold the device to the wall 5. As used herein, the term "static surface" refers to an immobile and flat object, for example, a wall, and a window. Contemplated surfaces need not be smooth, but may alternatively be uneven, or have cracks or crevices. For example, contemplated surfaces include crude concrete walls, block or brick walls, unfinished wood, and tile walls having spaces partially filled with grout. The device 10 is considered herein to be "self-mounting" because it can be affixed to a wall or other surface without using any extrinsic connector such as screws, rails, or glue.

The device 10 functions primarily to support one or more articles, which in this instance are exemplified by a paint can 62 and a screwdriver 63. Numerous specialized article supporting portions are contemplated, including the shelf 50 that supports the paint can 62, a channel 52 that supports screwdriver 63, a magnet 54, a ring 56, and a hook and loop fastener 58 (e.g., VELCRO). Each of these article supporting portions 50, 52, 54, 56, and 58 supports at least one article in a substantially fixed relationship with respect to a wall 5 or other static surface to which the suction cup 20 is suctionally affixed.

In a preferred embodiment, suction cup 20 is a round, pliable, rubber suction cup with a diameter of approximately 20 cm measured at the open portion, and with a wall strength of about 4 mm. In alternative embodiments, suction cup 20 may have many shapes other than round, including elliptical shapes and rectangular shapes. Various alternative materials for suction cup 20 are contemplated, including natural polymers, synthetic polymers, metals, and any reasonable combination thereof. For example, appropriate alternative materials are polyethylene, vulcanized rubber reinforced with aluminum bands, etc. With respect to the size of suction cup 20, many sizes besides 20 cm diameter are contemplated, including larger sizes of up to 60 cm, and more, and smaller sizes of about 5 cm, and less. Appropriate alternative suction cups are furthermore not limited to suction cups with a wall strength of about 4 mm, but may also have thicker or thinner wall strengths. For example, contemplated wall strengths are 1–3 mm, or less, and also 4–8 mm, or more. It is still further contemplated that suction cup 20 may alternatively include multiple partitions, and may also have more than one suction cup, including 2 to 6 suction cups, or even more.

Although suction cup 20 is preferably a traditional, plunger-type cup having a round cross-section, many alternative configurations are also contemplated, including suction surfaces with a single or multiple openings through which a vacuum can be applied. The term "vacuum" as used herein means any pressure lower than ambient pressure, as for example between a suction space and atmospheric pressure outside the suction space. Typical vacuums achieved with device contemplated herein fall between 1 and 600 Torr.

In a preferred embodiment, housing 30 is a rectangular polyvinyl chloride casing with the dimensions 10 cm×5 cm×7 cm (width×depth×height). However, in alternative embodiments many other shapes are contemplated for housing 30, including square and round shapes. With respect to dimensions of housing 30, various other dimensions than 10 cm×5 cm×7 cm (width×depth×height) are contemplated, so long as housing 30 can accommodate power source 36, vacuum source 32, switch 38 and vacuum line 40. For example, alternative housing 30 may be a cylinder with a diameter of about 6 cm and a length of approximately 15 cm. With respect to the material of housing 30 many other materials than polyvinyl chloride are contemplated including metals, natural and synthetic polymers, and any reasonable combination thereof. For example, appropriate alternative materials are rubber-coated aluminum, polystyrene, etc. It is further contemplated that housing 30 may also have an integrated handle to manipulate self-mounting device 10.

Housing bracket 31 is preferably a U-shaped polyvinyl chloride bracket that is glued to suction cup 20 as well as to the side walls of housing 30. In alternative embodiments, however, housing bracket 31 may have many other forms than a U-shape. For example, housing bracket 31 may have a round or polygonal shape. It is further contemplated that alternative housing bracket 31 may also comprise more than one element. For example, two separate brackets may be used to affix housing 30 to suction cup 20. In further alternative embodiments, housing bracket 31 need not be glued to suction cup 20, and housing 30, but may also be connected using connectors, including screws, bolts, and lock-type connectors.

Vacuum generator 32 comprises a motor 34 and a vacuum pump 33. In a preferred embodiment, motor 34 is a 12V-DC motor and vacuum pump 33 is a bi-directional vacuum pump with a maximum pumping capacity of about 3 liter/min. However, in alternative embodiments, various other types of motors are also contemplated including electrical motors, and combustion motors. For example, an alternative motors is an 120V AC motor. With respect to vacuum pump 34, many other vacuum pumps than a bi-directional vacuum pump are contemplated, including an uni-directional pump, and a membrane pump.

Power source 36 is preferably a rechargeable 12V battery, although other power sources are contemplated, including disposable batteries, external power supplies, and so forth. Switch 38 is preferably a low voltage on/off-switch, but may also be many other switches as long as the alternative switch is capable of opening and closing an electrical circuit. An optional vacuum sensor 39 may provide feedback to assist in controlling the motor and increasing the efficiency with which power is utilized. The various electrical connections required to couple the power source 36, switch 38, vacuum sensor 39, motor 34, and vacuum pump 33 are well within the skill of those in the art, and are omitted in the drawing for simplicity.

Vacuum line 40 is preferably a thick-walled flexible rubber tubing connecting vacuum pump 33 with suction cup 20. Alternatively, vacuum line 40 may include a metal tubing, or a polymer tubing.

Shelf 50 is preferably a shallow aluminum shelf of approximately 35 cm width and 30 cm depth and has furthermore a lip around the perimeter of about 1 cm height. Preferred shelf 50 has also several openings to accommodate tools, such as a screwdriver, and a wrench. In alternative embodiments, many materials other than aluminum are contemplated, including metals, synthetic polymers, glass fibers, and any reasonable combination thereof. Furthermore, many other sizes of shelf 50 are contemplated and. alternative shelf 50 may be sized between about 8 cm×10 cm and about 40 cm×60 cm.

Shelf brace 51 couples shelf 50 to housing 30. Shelf brace 51 is preferably a trapezoid having 2 mm thick walls, and is preferably glued onto the sides of shelf 50 and the sides of housing 30. Many other materials, configurations, and methods of affixing for shelf brace 51 are contemplated, so long as shelf brace 51 is capable of stably connecting housing 30 to shelf 50. For example, alternative shelf brace 51 may be a plastic cone, or a stainless steel rod.

FIG. 2 depicts another embodiment of the inventive subject matter, in which self-mounting device 110 generally has a suction cup 120 coupled to a shelf 150 through a housing 130. The suction cup 120 is contemplated to be roughly equivalent to suction cup 20 in FIG. 1, the shelf 150 is equivalent to shelf 50, and most other elements in FIG. 2 are equivalent to corresponding elements in FIG. 1. Thus, housing 130 comprises a vacuum generator 132 having vacuum pump 133, motor 134, and is directly coupled to shelf 150. Similarly, source 136 is electrically connected to motor 134 via switch 138, and vacuum generator 132 communicates with suction cup 120 via vacuum line 140. With respect to these and other components of self-mounting device 110, the same scope of variations is contemplated as for self-mounting device 10.

In this specific embodiment, however, device 110 includes a hook 154. Hook 154 is preferably a 13" aluminum band glued to housing 130 and has a ½" terminal hook. Many other configurations are also contemplated, including various sizes, and various numbers of hooks, so long as the hook or hooks can be used to prevent articles from falling down. Significantly, the hook 154 comprises an "article supporting portion" even though an article supported by the hook 154 may sway to and fro somewhat, or have some other movement relative to the wall. Thus, it is contemplated that while some article supporting portions such as shelf 50, channel 52, magnet 54, and hook and loop fastener 58 (e.g., VELCRO) would tend to retain an article in a "substantially fixed relationship" with wall 5, 105, or other static surface, other article supporting portions such as ring 56 and hook 154 would tend to retain articles in a relationship with wall 5, 105, or other static surface that is "not substantially fixed."

FIG. 2 is also different from FIG. 1 in having a handle 137 integrated into housing 130. Of course, alternative handles need not comprise an integral part of housing 130, and may instead be affixed to a housing using various methods, including screwing, gluing, welding, or any reasonable combination thereof. It is also contemplated that while handle 137 is predominantly employed to position the device 110, handle 137 could also conceivably also be utilized in supporting an article. For example, a handle 137 placed horizontally could be used to support the claw of a hammer. Similarly, it is recognized herein for the first time that a device such as that described in U.S. Pat. No. 5,95,001 to Burke could be affixed to a wall or other static surface, and the handle or other portion of the housing or body of the device could be employed to support an article above the ground by preventing the article from falling. To that end it is contemplated that a motorized suction device (interpreted broadly to include packaging for such a device) may be provided in association with a label, instructions, or other writing that designates the handle or other article supporting portion as being useful in supporting objects when the device is coupled to the static surface.

Thus, specific embodiments of self-mounting device employed to support articles have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. A self-mounting device, comprising:
   a suction cup that cooperates with an uneven and immobile surface to define a suction space, wherein the uneven and immobile surface allows for influx of air into the suction space;
   a motor coupled to a suction pump that cooperates with the suction space to create a vacuum in the suction space and that removes the air from the suction space; and
   an article supporting portion other than a handle that is mechanically coupled to the suction cup, wherein the article supporting portion is configured to support an article in a fixed relationship with respect to the uneven and immobile surface.

2. The device of claim 1, wherein the static surface comprises a wall.

3. The device of claim 1, further comprising a vacuum sensor.

4. The device of claim 3, wherein the vacuum sensor triggers operation of the motor.

5. The device of claim 1, wherein the supporting portion comprises a shelf.

6. The device of claim 1, wherein the supporting portion comprises at least one of a shelf and a fastener.

7. The device of claim , wherein the fastener comprises at least one of a hook, a ring, a channel, a magnet, and a hook and loop fastener.

8. The device of claim 1, wherein the supporting portion comprises a fastener.

9. The device of claim 1, wherein the fastener comprises a hook.

10. The device of claim 8, wherein the fastener comprises a ring.

11. The device of claim 8, wherein the fastener comprises a channel.

12. The device of claim 8, wherein the fastener comprises a magnet.

13. The device of claim 8, wherein the fastener comprises a hook and loop fastener.

\* \* \* \* \*